Aug. 18, 1964 M. E. HOMAN 3,145,293

BI-DIRECTIONAL BINARY COUNTER

Filed June 5, 1961 4 Sheets-Sheet 1

INVENTOR
MERLE E. HOMAN
BY Gunter A. Hauptman
ATTORNEY

Aug. 18, 1964 M. E. HOMAN 3,145,293

BI-DIRECTIONAL BINARY COUNTER

Filed June 5, 1961 4 Sheets-Sheet 3

FIG. 5 SUM CHECKING LOGIC
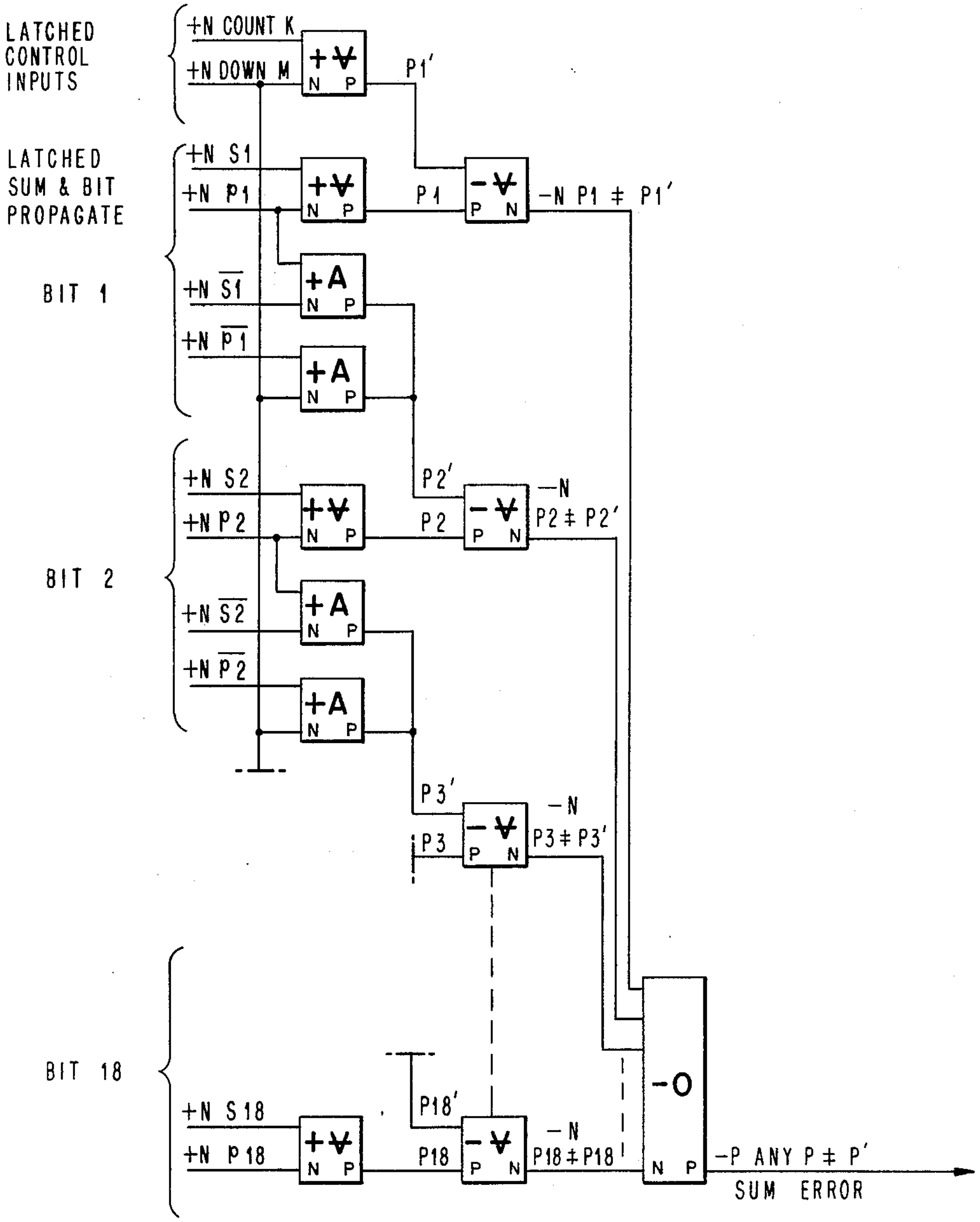

United States Patent Office 3,145,293

Patented Aug. 18, 1964

3,145,293

BI-DIRECTIONAL BINARY COUNTER

Merle E. Homan, Poughkeepsie, N.Y., assignor to International Business Machines Corporation, New York, N.Y., a corporation of New York Filed June 5, 1961, Ser. No. 115,033
6 Claims. (Cl. 235—92)

This invention relates to electronic circuitry. More particularly, this invention relates to a single high-speed circuit which performs bi-directional counting operations without serial carry propagation.

Electronic data processing systems make use of counters which register a number, often expressed in binary notation, to be either incremented or decremented as indicated by control signals. One control signal is required to indicate whether the counter is to be increased or decreased. Another control signal, called a "count" signal may optionally be provided to govern the start of counting. Counters also may have provisions for changes of more than one; for instance, it may be desirable to increment by three at a time.

The best known prior art counters utilize one flip-flop stage for each binary position. One of the outputs of each flip-flop is connected to the "complement" (state reversing) input of each succeeding higher order flip-flop. Each complement input is responsive to a change of the adjacent stage flip-flop state from the one to the zero state. All flip-flops are initially placed in the zero state, and a count signal is applied to the complement input of lowest order stage. The first count signal will set the first stage flip-flop to a one. The second count signal will set the first stage flip-flop to a zero, and the change from a one to a zero will be transmitted to the second stage flip-flop and cause it to be set to a one.

In this way, the one states of the flip-flops indicate, in binary notation, the number of input pulses applied.

It will be readily appreciated that the counting speed of the prior art counter just described is limited by the propagation speed of signals between adjacent stages. For instance, if all of the flip-flops are set to the one state, the next count signal to be applied should cause all of the flip-flops to be changed to the zero state. It is obvious that, since the input signal is applied to the first state, the signal that reverses the states of succeeding flip-flop stages must propagate down the line of stages resetting one after another in sequence. The time required for this serial propagation is in practice relatively long. Since it is undesirable to apply input pulses more rapidly than the total resolution time (the time required for the effect of an input pulse to completely change the count content in the counter) it is necessary to decrease, or possibly eliminate entirely, the "carry propagation" time. Counters attempting to overcome this problem have been devised. Page 195, Figure 7–3, in "Electronic Operations in Digital Computers" by R. K. Richards (D. Van Nostrand Company, Inc., 1955), shows a counter which permits input pulses to be applied to all stages simultaneously through AND circuits. The AND circuit associated with each stage of the counter is "selected" to pass a signal if all of the previous stages were set to a one.

This principle may be expressed as a rule: "Moving from low to high order, invert all consecutive ones and the first zero encountered. Do not alter the remaining bits."

This type of counter telescopes carry propagation time, permitting all carries to be made substantially in parallel. Count signals may be applied as rapidly as inherent circuit delays permit the flop-flops to be operated and the resulting changes to be transferred through the AND circuits. All of the flip-flops are changed substantially simultaneously and no flip-flop must wait for the preceding one to be operated before it can be operated.

However, the counter just described can be operated in one direction only; that is, it only counts up. It has been shown in the prior art that this same principle may be applied to count-up count-down counters by providing a second set of AND circuits associated with each flip-flop stage of the counter. See, for instance, "The Binary Quantizer" by Kay Howard Barney, November 1949, "Electrical Engineering" pages 962 to 967. In such a device only one set of AND circuits is enabled at a time, the other set being disabled. Count-up operations identical to those described in the R. K. Richards reference may be performed by enabling a first set of AND circuits connected as described previously, each AND circuit being selected if the previous stage was set to a one. When it is desired to count down, a second set of AND circuits is enabled and the first set is disabled. The second set is connected in the same manner as the first, with the exception that each AND circuit is selected if the previous stage was set to a zero.

The following rule is implemented when counting down: "Moving from low to high order, invert all consecutive zeroes and the first one encountered. Do not alter the remaining bits."

Though this type of counter permits incrementing and decrementing, it is relatively expensive and inefficient to provide two complete sets of AND circuits for each stage of the counter since these circuits are never simultaneously used. A further disadvantage is that a separate line to control counting up and a separate line to control counting down must be provided.

Therefore, an object of this invention is to provide an efficient and inexpensive high-speed bi-directional counter.

It is another object of this invention to provide apparatus enabling the control of the direction of count of a count-up count-down counter by one input control line.

It is another object of this invention to provide a bi-directional counter utilizing the same circuits for both incrementing and decrementing.

A further object of this invention is to provide apparatus which substantially eliminates carry propagation between storage stages of a count-up count-down counter.

Still another object of this invention is to provide a high-speed binary bi-directional counter having a single count direction control line, utilizing the same circuits for both count directions and having means not limited by inter-stage carry propagation delays.

A still further object is to provide a novel apparatus for bi-directional counting, including means for checking the accuracy of operation.

The foregoing and other objects, features and advantages of the invention will be apparent from the following more particular description of preferred embodiments of the invention, as illustrated in the accompanying drawings.

These objects are achieved in the apparatus of this invention by providing a combination "add one/subtract one" adder. This adder receives the present count to be incremented or decremented, adds or subtracts one and emits a sum representing the new count. Carry propagation delays are practically eliminated in this adder by generating all carries in parallel from the initial input number. The direction of count is controlled by a single input to a circuit associated with the parallel carry generation circuitry. Thus a single line determines the count direction, and the same circuits are utilized for both counting up and counting down. The invention includes novel circuitry for checking the accuracy of the counter.

In the figures:

FIGURE 5 is a block diagram showing sum checking logic usable with the detailed embodiment of the invention shown in FIGURE 4.

Figure 1:
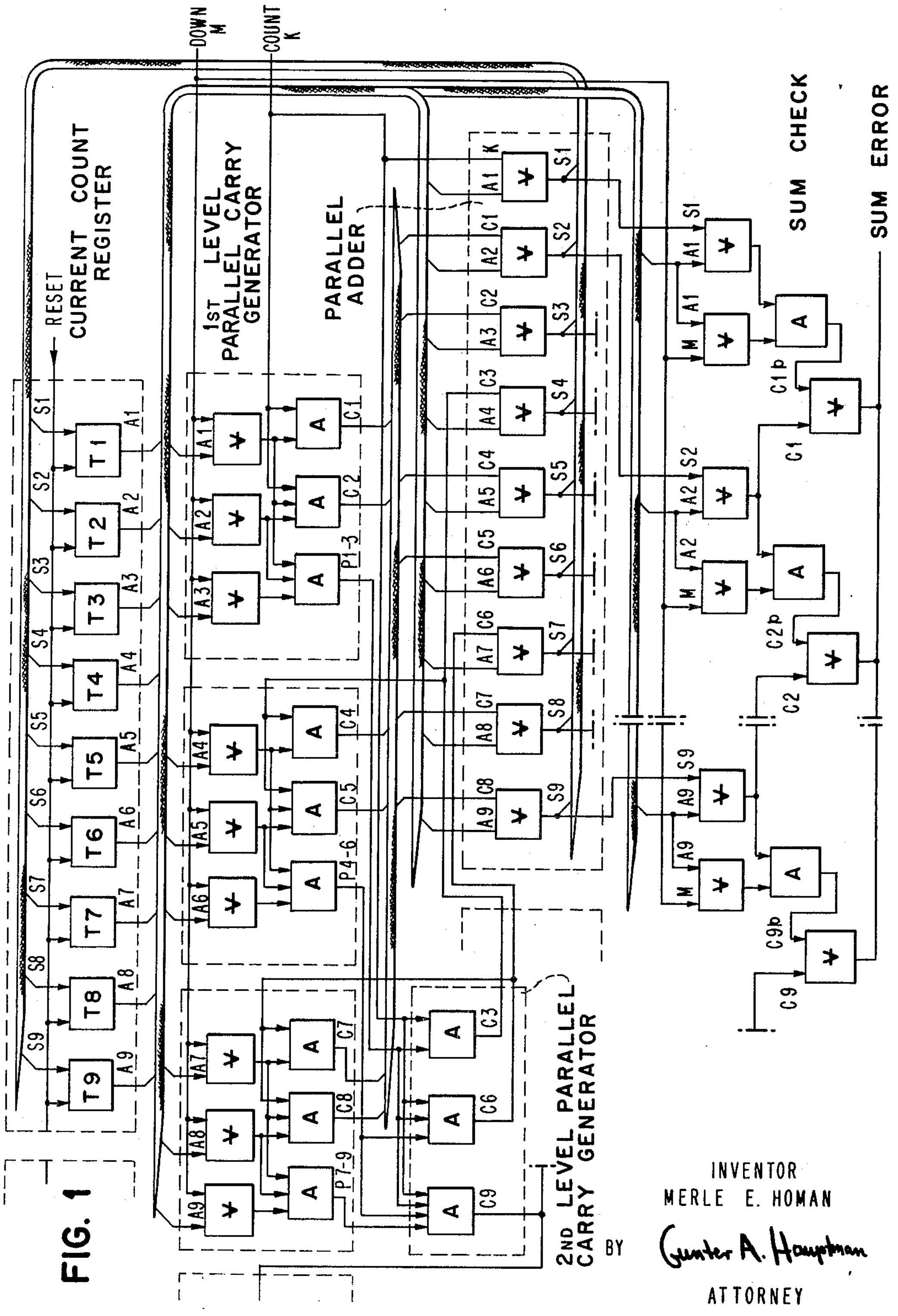
FIGURE 1 is a block diagram showing a simplified embodiment of the invention.

The counter, or "add one/subtract one" system to be described, achieves maximum speed by utilizing parallel design. Parallel design permits all orders of an input number to be entered and operated upon simultaneously, and al orders of the output sum to be formed at essentially the same time. A fixed delay characteristic results from the many parallel paths incorporated in the design. Checking logic is included to detect all single errors without increasing the cycle time.

Comparisons show that parallel design provides greatly increased speed with relatively little additional cost. This approach is particularly rewarding for large counters. Where additional speed is required to match other elements of a computer, a slight increase in counter cost will be justified to obtain increased machine performance. Where this extra speed is not required, the parallel design may still be advantageous, if slower but low cost components can be used to offset the cost of the additional components. Parallel design provides count-up count-down and data transfer modes. The data transfer mode uses checking logic in the counter to provide economically checked register-to-register transfer of data. The design may be applied efficiently and easily to any specified set of circuit elements. Using diffused junction transistors in current switching and emitter-follower circuits, a counting rate of four megacycles may be achieved.

By inspection of a series of consecutive binary numbers, the following rule for counting up by one (add 1) may be stated: "Moving from low to high order, invert all consecutive ones and the first zero encountered. Do not alter the remaining bits."

An equivalent rule for counting down by one (subtract 1) may also be stated: "Moving from low to high order, invert all consecutive zeros and the first one encountered. Do not alter the remaining bits."

The second rule is the same as the first except that ones are replaced by zeros and zeros are replaced by ones. The logical network needed to indicate the existence of consecutive ones for counting up may therefore also be used for counting down. Means for inverting all bits of the input number into this "propagating" system is the only addition required. This results in a more economical design than can be achieved with a duplicate "propagating" system for counting down, particularly when parallel logic is used to achieve a high counting rate.

In terms of Boolean expressions, the counter may be described as follows: Let "A" represent a binary input number having "$n$" bits, where:

(1) $$A=A_n2^{n-1}+A_n2^{n-2}+\ldots+A_12^o$$

For counting up, a "propagating" function "$P^{up}$" is required for each bit position "$k$" of the adder to represent ones in all lower orders:

(2) $$P_k^{up}=A_{k-1}.A_{k-2}\ldots A_1.(\overline{DOWN})$$

For counting down, a "propagating" function "$P^{down}$" is required for each bit position "$k$" of the subtractor to represent zeros in all lower orders:

(3) $$P_k^{down}=\bar{A}_{k-1}.\bar{A}_{k-2}\ldots\bar{A}_1.(DOWN)$$

These may be combined for counting up and down:

(4) $$P_k=A_{k-1}.A_{k-2}\ldots A_1.(\overline{DOWN})+\bar{A}_{k-1}.\bar{A}_{k-2}\ldots\bar{A}_1.(DOWN)$$

If we define a "bit propagate" function "$p$" as:

(5) $$p_k=A_k\veebar DOWN$$

Then by substitution, (4) becomes:

(6) $$P_k=p_{k-1}.p_{k-2}\ldots p_1$$

Letting "S" represent the output number of a "$n$" position counter:

(7) $$S_k=P_k\veebar A_k$$

Figure 3:
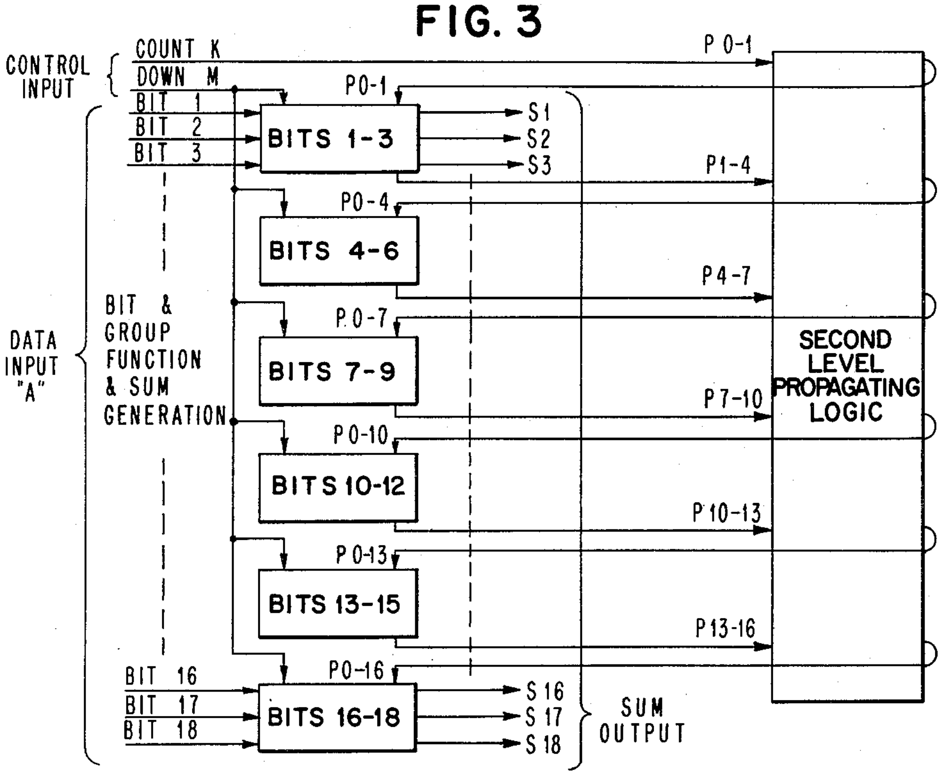
FIGURE 3 is a block diagram showing the overall layout of the detailed embodiment of the invention.

Referring to FIGURE 3, an overall layout of a detailed practical embodiment is shown. Practical design considerations demand that the counter be subdivided into six groups of three bits each. To avoid additional logical delay, the three sum bits in each group are generated directly from the propagate functions described above and the original input number in a single decoding stage. The DOWN line is enabled when decrementing and disabled ($\overline{DOWN}$) when incrementing.

The COUNT line enables the counting logic for either counting up or counting down. Absence of a signal on this line permits usage of the counter path for checked register-to-register transfers without data modification. A count propagation to the low order bit of any group is represented by $P_{o-j}$ coming from the second level propagating logic. These sums are therefore generated by the expression:

(8) $$S_j=P_{o-j}\veebar A_j$$

where $j=1, 4, 7, 10, 13$ and $16$.

For the other two bits in each group:

(9) $$P_k=P_{o-j}.P_{j-k}$$

where $k$ does not include $j$.

Substituting this into Equation 7 gives:

(10) $$S_k=P_{o-j}.P_{j-k}.\bar{A}_k+\bar{P}_{o-j}.P_{j-k}.A_k+\bar{P}_{j-k}.A_k$$

Note that the second $P_{j-k}$ term is present in order that the three terms of this expression are mutually exclusive.

The DOWN line is enabled only when counting down, being disabled when counting up. As a result, data entering the counter on the data input lines "BIT 1" through "BIT 18" is decremented by one at the sum output lines if both the COUNT and the DOWN lines are enabled. If the COUNT line is not enabled, the data input is unaffected, regardless of the DOWN line condition. It should be noted that the COUNT line can be simply eliminated by deriving a COUNT signal from the input to the DOWN line or by another method described with reference to the simplified embodiment. Further, the count can be designed to increment or decrement by more than one.

Figure 2:
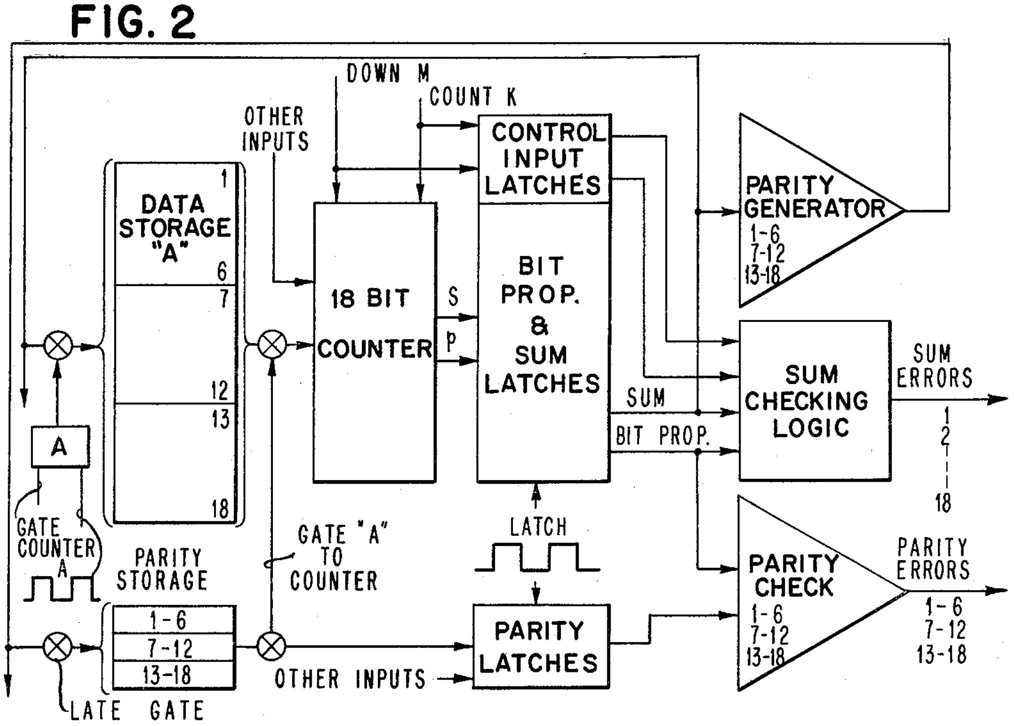
FIGURE 2 is a block diagram showing a circuit utilizing a detailed embodiment of the invention.

Referring to FIGURE 2, the 18-bit counter of FIGURE 3 is shown in an illustrative environment. Data "A" stored in the Data Storage is gated into the counter for counting. The "new" count is then entered into Sum Latches for temporary storage. Bit propagate and the latched sum information is utilized by Sum Checking Logic to establish the validity of the result. The sum ("new" or "updated" count) is then gated into the Data Storage.

The Sum Checking Logic detects all single errors in the sum output. On the basis of sum and bit propagate information from each order of the counter, the actual propagating conditions for that order are determined (by inference) and the propagating conditions for the next higher order are predicted. By comparing the inferred and predicted propagating outputs for each order, the existence of any single error will be detected. The comparator outputs may be grouped, before error indication, to provide any required degree of fault isolation, including individual indication for each bit.

Since:

(7) $$S_k=P_k\veebar A_k$$

and (5) $$p_k = A_k \veebar D$$

(where $D$=DOWN).

Then:

(11) $$P_k = S_k \veebar p_k \veebar D$$

Eliminating D:

(12) $$P_k = S_k \veebar p_k$$

(with the polarity of $P_k$ inverted when counting down).

This $P_k$ represents the actual propagating condition for the $k$th order, with a true representation for the count-up case and an inverted representation for the count-down case. As shown below, a predicted propagate for the $k+1$ order can be developed which is also inverted for the count-down case. The comparison of actual and predicted propagates is therefore valid for both cases.

The predicted propagating condition for the next higher order, $P'_{k+1}$, may be generated as follows. For counting up:

(13) $$P'_{k+1}(\text{count up}) = p_k . \bar{S}_k$$

where $p_k = A_k$.

The presence of $p_k$, the $k$th order propagates, and the inversion of $A_k$ to give $S_k$ means that all lower order bits are also "propagating." For counting down:

(14) $$P'_{k+1}(\text{count down}) = p_k . S_k$$

where $p_k = \bar{A}_k$.

The presence of $p_k$, the $k$th order propagates and the inversion of the $\bar{A}_k$ to give $S_k$ means that all lower order bits are also "propagating." Inverting (14) to invert the polarity of the output in the count-down case, for correspondence with Equation 12 and combining with 13 gives:

(15) $$P'_{k+1} = p_k . \bar{S} + \overline{p_k . S_k . D} = p_k \bar{S}_k + \bar{p}_k . D$$

Other expressions for generating predicted propagates may be developed from the sum and input number as well as from the sum and bit propagate bits. In this design, which checks latched information during register ingating time, the use of bit-propagate signals for both parity and sum checking avoids the need for additional latches. In other designs the following expressions may be implemented with fewer components in the actual sum checking logic:

(16) $$P_k = S_k \veebar A_k$$

(with true output for both up and down cases) and

(17) $$P'_{k+1} = P_k . p_k$$

(where $P_k$ shares the output of Equation 16 and where there is a true output for both up and down cases).

The $A_k$ input in Equation 16 may be used as a checked input without alteration of the parity checking system.

Still referring to FIGURE 2, all gating, storage, input oring and bit propagate generation elements are parity checked for single errors. A separate parity bit is generated from the latch outputs for each six bits of the sum. This generation occurs during the time that the sum is being gated into the Data Storage so that cycle time is not affected. The parity bits are then gated into the adjoining Parity Storage by means of a "late" gate. Late arrival in this storage is made up for in the succeeding cycle since the parity bits bypass the counting logic. Small parity groups are used to minimize the number of logical stages in the generating and checking parity trees and to provide fault localization. The bit-propagate generation logic may be included in the six-bit parity checking path because an even number of bits may be inverted without affecting parity. The bit-propagate function, thus checked, is in turn used as an input to the sum checking logic.

*Simplified Embodiment*

Referring to FIGURE 1, there is shown a logic diagram of a simplified embodiment of the invention. The basic counter consists of a parallel adder, first-level parallel carry generator, second-level parallel carry generator and sum check circuitry. The data to be operated upon is stored in a current count register and the data after counting is returned to the current count register. It is a matter of choice whether the register is, or is not, included as part of the counter. Errors are indicated by signals on the line SUM ERROR.

The current count register comprises a number of triggers, indicated in FIGURE 1 as T1 through T9, each having a set input (S1 through S9), a one output (A1 through A9) and a reset input connected to the RESET input line. Any number of additional triggers may be provided depending upon the size of the counter desired. Only nine triggers (of a large counter) are shown in FIG. 1 for purposes of illustration. Signals applied to the triggers T1 through T9 on the sum input lines S1 through S9 cause selected ones of the triggers to be set to the one state signals in accordance with "one" on the lines S1 through S9. If a signal applied to one of triggers T1 through T9 is a zero, that particular trigger is not set to a one. The controls for the current count register are so timed that the triggers T1 through T9 are all reset by a signal on the RESET line before new information is entered into the triggers. Therefore, the triggers T1 through T9 will be set to correspond to the signals appearing on the lines S1 through S9. Whenever any one of the triggers is set to the one state, the corresponding output lines A1 through A9 will rise. In this manner, the triggers T1 through T9 act to store the signals appearing on lines S1 through S9 as a static levels on lines A1 through A9.

When it is desirable to increment or decrement the contents of the current count register the control lines DOWN M and COUNT K are operated. These two lines carry signals indicating the direction of the count; that is, count up (increment) or count down (decrement), and whether any count shall be made at all. When the COUNT K line is operated, the contents of the current count register will be changed depending upon the condition of the DOWN M line. If the DOWN M line is enabled (i.e., it has a signal designated, for purposes of illustration only, as positive), the contents of the current count register will be decremented. If the DOWN M line is disabled at the time that the COUNT K line is operated (a negative signal in this particular illustration), the contents of the current count register will be incremented by one. For instance, if the contents of the current count register are . . . 111111110, and if the DOWN M carries a negative signal, then the current count register will become . . . 111111111. Otherwise, if the DOWN M line carries a positive signal, the contents of the current count register subsequently becomes . . . 111111101.

The parallel adder shown in FIGURE 1 serves to add one or subtract one from the data stored in the current count register by combining the output information on lines A1 through A9 with the carries (or borrows) that would result if a plus one or minus one was added into the lowest order of the adder. All of the carries C1 through C8 representing the carry (or borrow) from the next succeeding lower order, are entered into the adder substantially in parallel. The COUNT K line signal is entered into the lowest order of the parallel adder, whether counting up or counting down, and the "carries" C1 through C8 are such as to automatically give the proper result regardless of the direction of the count, as will be described. The parallel adder comprises a number of exclusive OR blocks $\veebar$ corresponding to the number of states in the counter (of which nine are shown). Each exclusive OR block has inputs for a number to be summed (A1 through A9) and a carry (K and C1 through C8) and an output representing the sum (S1 through S9) of corresponding ones of the input numbers and carries. In this respect the exclusive OR blocks act as "half adders" with the exception that they have no provision for generating carries. If the inputs (A1 and K) to the first stage exclusive OR are both ones, the output (S1) will be zero. Though there should be a carry, it is not generated in this state, but rather in the parallel carry generator. For example, when counting up, in the case where A1 through A9 are all ones, it is to be expected that there will be a carry (C1 through C8) for every position of the parallel adder. The carries (C1 through C8) will be applied to the parallel adder substantially in parallel causing zero signals to appear at the outputs (S1 through S9) at substantially the same time. Since it is known that the COUNT K line has a positive signal on it there will also be a zero output on the S1 line.

In the event that it is desirable to eliminate the COUNT K line, the first stage of the parallel adder may be an inverter instead of an exclusive OR. This is possible because, whether counting up or counting down, assuming that counting is being performed, the first bit position of the number to be counted will always be inverted. This is obvious from FIGURE 1, where the COUNT K line always carries a signal when counting, causing the first stage exclusive OR output (S1) to always be the inverse of the input number (A1).

The manner in which parallel carries are generated will now be described. The term "carries" is used in a special sense in describing this invention. When counting up the "carries" are true interstage carries, but when counting down the signals generated can more accurately be called "borrows." The first level parallel carry generator includes a number of groups of exclusive OR (⊻) and AND blocks (A). The size of each group is arbitrary, being determined by the number of inputs possible to the particular logic circuits utilized by the implementation of the invention. The larger the blocks the faster (and the more complicated) the device will be. If the first level parallel carry generator is divided into a number of three-bit sections, a second level carry generator must be provided to inter-connect each of the sections. Though the delays in the generation of the carries are increased by each level of carry generation, the circuitry is simplified.

Still referring to the first level parallel carry generator of FIGURE 1, the current count register outputs A1 through A9, the DOWN M line and the COUNT K line signals are used to generate carries from positions C1, C2, C4, C5, C7 and C8. For purposes of illustration, only those carries used by a nine-bit counter having three-bit groups, are shown. Due to the breaking up of the first level parallel carry generator into three blocks, the output signals (P1–3, P4–6, P7–9) from the last stage of each block do not indicate the carry to the next stage. There is an output P1–3 only if inputs A1, A2 and A3 are all ones, when counting up, or all zeros when counting down. The output P1–3 is then used to determine whether a carry should be sent to the next block. This determination is made in the second level parallel carry generator to be described below. Thus an output P1–3, P4–6, P7–9, etc., occurs only if all inputs (A1 through A9) associated with the group are ones (counting up) or zeros (counting down). The propagate P1–3, etc., also represents a "carry" from the related block as a result of one of these two conditions, if an input COUNT K, C3, C6, etc., is applied to that block. Each block separately generates two carry signals and one propagate signal. The carry signals C1 and C2 and the propagate P1–3 occur at the same time as all the other propagate signals (P4–6, P7–9, etc.). The remaining first level carries C4, C5, C7 and C8 occur substantially simultaneously. The second level parallel carry generator utilizes the parallel propagate information to generate three additional carries substantially in parallel. It will be seen that the second and third blocks of the first level parallel carry generator depend upon the outputs from the second level parallel carry generator to generate their carries in turn. Therefore, there is a form of one level serial signal propagation between the first and second level parallel carry generators due to delays inherent in the AND circuits. This delay is quite small, however, and may be neglected in comparison with the carry delays normally inherent in systems depending upon serial carry propagation for operation. As stated previously, this delay can be eliminated entirely by designing the first level parallel carry generator as one unit, eliminating the need for a second level parallel carry generator.

Each section of the first level parallel carry generator shown in FIGURE 1 comprises three exclusive OR blocks and three AND blocks. Each of the exclusive OR blocks acts as a true complement control for the current count register outputs A1 through A9. If the DOWN M line has a positive signal on it the exclusive OR blocks act as inverters. If the DOWN M line does not have a positive signal on it, then the exclusive OR blocks act to pass the signals A1 through A9 without change. This action is inherent in the logical operation of exclusive OR blocks. When a one input (from the DOWN M line) is applied to one input then an exclusive OR block output will be the opposite complement of the other input. For instance, with a one input on the DOWN M line, if the input A1 is a one, then the exclusive OR function is not satisfied and the output must be zero. If the input A1 is a zero, then the exclusive OR function is satisfied and the output will be a one.

Each of the AND circuits receives inputs from certain ones of the exclusive OR outputs. In addition, in the first block two of the AND circuits receive inputs from the COUNT K line, and in each of the other blocks two AND circuits receive inputs from the second level parallel carry generator. The additional inputs represent "carries" into the particular block. As an example, if there is a one in the A1 position of the current count register and the DOWN M line is negative (counting up) then it is to be expected that there will be a carry from the first position C1. Inspection of FIGURE 1 shows this to be true since there will be a one (A1) and a zero (M) applied to the lowest carry exclusive OR transmitting a one to the lowest order circuit. An output C1 results from this AND circuit since both inputs are positive. If the DOWN M line had a positive signal on it (counting down) the output of the exclusive OR block would have been zero and the output of the AND block would have been zero (i.e., no carry C1).

As previously explained with reference to the parallel adder, if it is desirable to eliminate the COUNT K line the first stage AND circuit of the first block could be removed, because the output of the first stage exclusive OR block is always transferred to the output C1 without change.

The outputs (P1–3, P4–6, P7–9, etc.) from the third AND circuit in each block do not necessarily represent a "carry"; each one indicates that there is a one bit (counting up) or zero bit (counting down), input A1 through A9 corresponding to each position of the associated block. The output P1–3 from the first block is a special case that does in fact represent the "carry" from bit position three (3).

The second level parallel carry generator comprises three AND circuits, one for each three bit block, more being supplied if the counter has more than nine positions. Each AND circuit generates a carry (C3, C6, C9, etc.) in accordance with a signal on the COUNT K line and additional inputs. The lowest order AND circuit has an additional input P1–3 from the first level parallel carry generator. The middle AND circuit has additional propagate inputs P1–3 and P4–6. The next AND circuit receives additional inputs from the P1–3, P4–6 and P7–9 outputs of the first level parallel carry generator.

Note that if it is desirable to omit the COUNT K line, the lowest order AND block may be removed and the K inputs to the other AND circuits will be omitted. Thus, the lowest order propagate P1–3 would be used directly to generate the carry C3 from the third bit position.

The sum checking circuitry shown in FIGURE 1 checks the results of the count on the basis of the initial count (A1 through A9), the final count (S1 through S9) and the signal on the down M line. Utilizing this information, the sum check circuitry generates a predicted carry and an inferred actual carry, which are compared in an exclusive OR circuit to indicate whether or not there has been a counting error. This particular method of checking the sum makes it possible to use parity checked inputs (A1 through A9) and outputs (S1 through S9), whereas other parameters available in the counter (for instance the carries) cannot easily be checked by parity means. Each bit position of the counter requires two exclusive OR circuits and one AND circuit. In addition, each two adjacent bit positions of the counter share one exclusive OR block. The first of two exclusive OR blocks receive inputs from the current count register for the corresponding bit position (A1 through A9), the output of the parallel adder for that bit position (S1 through S9), and the DOWN M input. These inputs are utilized, as shown in FIGURE 1, to supply the inputs of an AND circuit. The output of the AND circuit is positive whenever a carry (C1 through C9) from the corresponding bit position is predicted. For example, if counting down when there is a one in bit position A1, the exclusive OR circuit inputs M and A1 will both be positive, and input S1 will be negative. Thus one exclusive OR circuit will have a positive output and the other will not. The one with the negative output will block the associated AND circuit, keeping its output negative. Thus, there will be no predicted carry (C1*p*) from the lowest order bit position. If in this example, however, the counter was being counted up, the input M would now be negative, causing an output from both exclusive OR circuits. As a result, there will be an output C1*p* from the lowest order AND block.

The right hand exclusive OR block of each sum checking circuit associated with a bit position is used to infer what carry must have been necessary to give the indicated result. For instance, in the second bit position, the exclusive OR block having inputs A2 and S2 has an output whenever the inputs are different. It is obvious that the only way an input (A1 through A9) can be different from a received output (S1 through S9) is when there has been a carry into that particular bit position. Therefore, if the inputs A2 and S3 are different a carry (C1) from the previous position C1 is inferred. This inferred carry (C1) is compared with the previously predicted carry (C1*p*) in another exclusive OR block. If they are the same there will be no output from these exclusive OR blocks. If they are different the sum error line will come up.

The operation of the simplified embodiment of the invention will now be described with reference to FIGURE 1. It will be assumed that the current count register contains the following binary number: 001110111. It will be shown how this number is incremented by one and then how the resulting number is decremented by one to return it to the initial value. Using the previously mentioned rules it can be predicted that when the binary number 001110111 is incremented by one that the first bit position will be inverted and that all subsequent following bit positions having a one will be inverted, as will be the first bit position that has a zero. All remaining bit positions will stay the same as before. Therefore, it is expected that the result of counting by one will be: 001111000. When this incremented number is counted down by one the rule is that the first bit position is inverted and that all subsequent bit positions having a zero are inverted, as will be the first bit position encountered that has a one. All remaining bit positions stay the same as before. Therefore, it is expected that the result will be: 001110111, which is the same as the initial count.

Referring to the current count register, trigger T1 is set to the one state (making its output A1 positive). Similarly the triggers T2, T3, T5, T6 and T7 are set to the one state. As a result, the outputs A1, A2, A3, A5, A6 and A7 of the current count register are positive.

Referring to the first level parallel carry generator, the inputs to the exclusive OR circuits for bit positions A1, A2, A3, A5, A6 and A7 are up. Since the counter is being incremented, the DOWN M line will be negative. Therefore, the only exclusive OR circuits which have the logical condition that one and only one input is up are those corresponding to the bit positions just indicated. The AND circuits of the first level parallel carry generator corresponding to bit positions A1, A2, and A3 will have all their inputs up, the COUNT K line being positive and there being outputs from the exclusive OR blocks for bit positions A1, A2, and A3. As a result carries C1 and C2 and propagate P1–3 will be simultaneously generated. The carries C1 and C2 are transferred to the parallel adder.

The propagate P1–3 is supplied to all of the AND circuits of the second level parallel carry generator. But the only output from this generator will be the carry C3 because the inputs P4–6 and P7–9 lines are not positive for the other two AND blocks. As a result the carry C3 is generated from the second level parallel carry generator to the first level parallel carry generator and to the parallel adder. Thus, carries from bit positions A1, A2 and A3 are generated.

Referring to the parallel adder, both inputs A1 and K of the exclusive OR circuit for the first bit position are positive. Similarly, both inputs of each of the exclusive OR circuits for the second and third bit positions are positive. Only the input C3 of the exclusive OR circuit for bit position 4 is positive. The exclusive OR circuits for the bit positions S5, S6 and S7 have only the respective ones of the inputs A5, A6 and A7 positive. Therefore, there are positive outputs from the exclusive OR circuits for those bit positions connected to output lines S4, S5, S6 and S7.

When the current count register "reset" line is brought up, all of the triggers T1 through T9 are reset to zero; and when the signal on the "reset" line is removed, the triggers T4, T5, T6 and T7 are set to the outputs S4, S5, S6 and S7 of the parallel adder. As a result, the incremented number (001111000) is stored in the current count register to replace the initial number (001110111).

The sum checking circuitry is operative before the current count register is reset to determine whether the sum stored in the current count register is correct. In the event that the sum checking circuitry indicates an error, simple circuitry for preventing the erroneous sum from being entered into the current count register can be devised if desired. Referring to the sum checking circuitry associated with the first bit position of the input, the only inputs that are positive are the A1 inputs to the two lowest order exclusive OR circuits. As a result, there will be an output C1*p* (predicted carry from the first order) from the associated AND circuit, applied to one input of the exclusive OR circuit shared by the first two bit positions. Referring to the sum checking circuitry associated with the second bit position, the only inputs to the exclusive OR circuit are the ones due to the A2 output from the current count register. As a result there will be an input C1 (inferred carry from the first order) circuit to the exclusive OR associated with the first and second orders. There will be no sum error outputs from this exclusive OR circuit, both inputs being present. Still referring to the second order sum check circuitry, both inputs to the AND circuit are present causing a predicted carry from the second order C2*p* to be generated. In the manner just described, there will be generated an inferred carry C2 from the second bit position, from circuitry not shown, there not being any output from the exclusive OR block between the second and third orders either. The third bit position will be checked in a similar manner. The inputs to the exclusive OR circuits corresponding to the fourth bit position will all be negative with the exception of S4 since there is an output from the parallel adder, fourth bit position. However, since only one of the inputs to the associated AND circuit is up there will be no predicted carry C4*p* for this bit position. But the output of the exclusive OR block having input A4 and S4 does verify the predicted carry C3*p* since there must have been a carry C3 to cause the input A4 and the output S4 to be different. The inputs to the exclusive OR blocks for the fifth position are such as to block the associated AND circuit since not only A5 is present but also S5. As a result there will be no predicted carry C5*p* for that order. There also will be no inferred carry C4 from the previous order, resulting in negative signals to both inputs of the exclusive OR block associated with the fourth order positions. The remaining sum check circuits operate in a similar manner, no "error" signal being emitted.

The current count 001111000 will now be incremented by making the DOWN M line positive and the COUNT K line positive. The current count register outputs A4, A5, A6 and A7 are initially positive. In the first level parallel carry generator, the DOWN M line being positive, all of the exclusive OR circuits associated with the current count register triggers having zero bits stored therein will have outputs; the exclusive OR circuits associated with triggers having one bits will not have outputs. As a result carries C1 and C2 and a propagate P1–3 applied to the second level parallel carry generator will have outputs. In the second level parallel carry generator, the propagate P1–3 and the COUNT input will cause a carry C3. No other AND circuits have all inputs activated. The parallel adder inputs K, C1, C2, C3 and A4, A5, A6 and A7 are positive. As a result there will be outputs on lines S1, S2, S3, S5, S6 and S7. When the reset signal is applied to the current count register all triggers T1 through T9 will be set to 0 and then will be set to correspond to the signals on the parallel adder output lines. Application of the sum and the initial value in the current count register to the sum check circuitry as previously described will indicate that there is no sum error.

*Detailed Embodiment*

A detailed embodiment of the invention, comprising an 18-bit sum checked count-up count-down counter will now be described. This counter utilizes standard transistor logic well-known in the art. Symbols in each of the logic blocks indicate the function performed by the circuits represented, for instance, "+$\underline{V}$" indicates that the block is an ordinary exclusive OR. A "—" in front of a logic function designation indicates that the logic circuit receives negative signals to perform the indicated logic function. Normally, positive blocks receive positive signals. When a block has two outputs, the upper one of the two is the complement of the function performed by the block and the lower one is a true representation of the function performed. The letters P and N indicate different voltage levels. The signs of these voltage levels are indicated by "+" and "—" signs.

Figure 4:
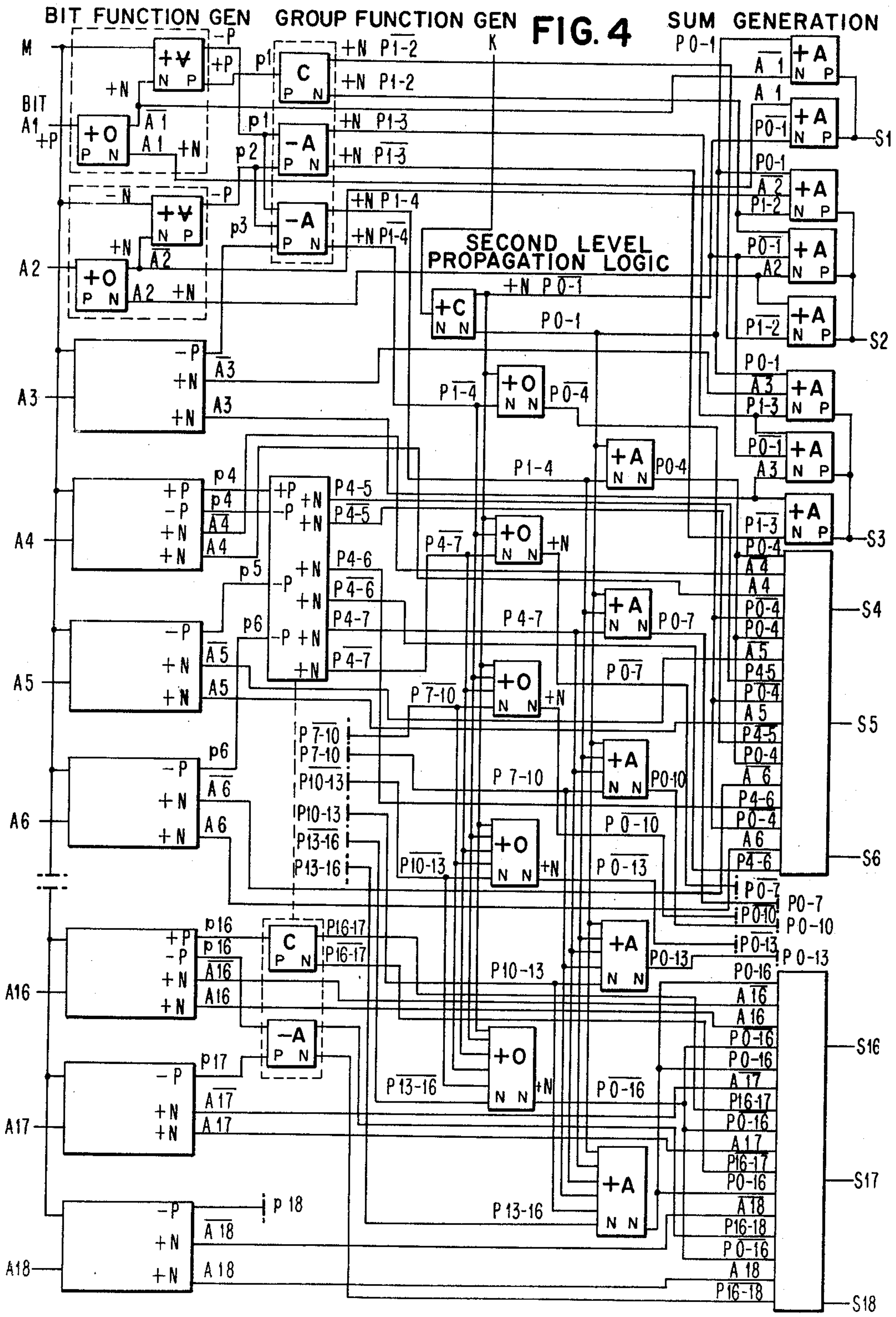
FIGURE 4 is a block diagram showing the detailed embodiment of the invention.

Referring to FIGURE 4, the bit function generator and group function generator perform the first level parallel carry generation operation. The bit function generator is an embodiment of Equation 5 given previously. Each one of the 18-bit positions of the bit function generator comprise a single exclusive OR block "+$\underline{V}$" and a single OR block "+O." The DOWN M line enters one input of each one of the exclusive OR blocks. The bit position input lines A1 through A18 enter respective ones of the OR blocks. The upper (complement) output of each OR block enters one of the inputs of the associated exclusive OR block and also leaves the bit function generator. The remaining (true) output of the OR blocks and the true and complement outputs of the exclusive OR block are used as outputs from the bit function generator. Therefore, for each bit position, the incoming quantity represented by signals on the lines A1 through A18 passes through the OR circuit and emerges as a true output A1 and as a complement output $\overline{A1}$. The OR block also permits additional quantities to be entered into the counter from other sources. Signals on the complement output of the OR blocks and the DOWN M line enter the exclusive OR blocks and emerge as a negative signal *p*1 through *p*18 from the top outputs of the exclusive OR blocks. When counting down, the DOWN M line being negative, signals A1 through A18 applied to corresponding ones of the OR circuit "+O" are applied to the exclusive OR blocks as negative signals, preventing the generation of signals from outputs *p*1 through *p*18. However, when counting up, the DOWN M line is positive so that if a one bit is present at the inputs to the OR blocks, the outputs of the corresponding exclusive OR blocks will have the value *p*1 through *p*18.

The group function generator is provided in sections, one section for each three bit group of the bit function generator. Each group consists of a convert block C and two AND blocks "—A." The group function generator group receives signals from the bit function generator outputs on lines *p*1 through *p*17. The group function generator generates two $P_{j-k}$ functions (P1–2, $\overline{P1–2}$, etc.) for each three-bit group, which functions go directly to sum generating circuitry. (The letter *j* represents the lowest order bit of the various three-bit groups, $P_{j-k}$ meaning that bits *j–k* are "propagating." For instance, the first block of the group function generator receives inputs *p*1, *p*2, and *p*3 and generates true outputs P1–2, P1–3, and P1–4 and the complements $\overline{P1–2}$, $\overline{P1–3}$ and $\overline{P1–4}$. A signal on the lines P1–4, P4–7, P13–16, signifies that all three bits of the group that the signal emanates from are "propagative." These group propagating functions are combined in second level propagation logic to generate P0–j outputs in complementary pairs (P0–1, $\overline{P0–1}$, etc.) representing count propagation to each of the three-bit subgroups.

The second level propagation logic comprises a number of OR "+O" blocks, $\overline{\text{AND}}$ "+A" blocks and a convert C block. The outputs (P0–1, P0–4, P0–7, P0–10, P0–13 and P0–16) from the second level propagation logic indicate that there has been a propagation from the input bit (a signal on the COUNT K line is the zero order input) right through to the present first bit of the group (*j*). For example, the second level propagation logic generates an output P0–4, which indicates that all three bits of the group receiving information from the signals A1 through A3 are "propagating." To avoid additional logical delay, a sum is generated in a single decoding stage utilizing the propagate functions P0–*j* and $P_{j-k}$, described above, and the orignal input numbers A1 through A18.

The sum generation circuitry is comprised of a number of AND blocks "+A," with their outputs connected to perform the OR function embodying Equation 10 previously given. For the purposes of explanation, the operation of the sum generation circuitry can be understood if the inputs P0–*j* (P0–1, P0–4, P0–10, etc.) are viewed as representing propagation from the COUNT K line input through to the order represented by the letter *j*, which will always be the lowest bit position of a group. The other inputs $P_{j-k}$ (for instance, P1–2, P1–3, etc.), represent propagation within a group only. Thus, the P0–*j* functions represent intergroup propagation. The $P_{j-k}$ terms indicate intra-group propagations. A P0–*j* or $P_{j-k}$ term occurs only if all previous intergroup and intragroup propagations occurred. As an example, the third bit position sum generation circuitry receives inputs P0–1, P1–3, A3 and complements of each.

Referring to the first AND block "+A," the P0–1 input represents the presence of signal on the COUNT K line. If there is a signal on the $\overline{A3}$ input and a signal on the P1–3 input lines, there will be a one output on line S3. This is to be expected if the input to the third position A3 is a zero ($\overline{A3}$), and there is a propagation from the first bit position through to the third bit position (P1–3). The second AND block "+A" in the third group receives inputs P1–3, $\overline{P0–1}$, and A3. When there is a propagate from the first to the third bit position (P1–3) and the third input (A3) is a one, the output S3 should be a one when the COUNT K line is down ($\overline{P0–1}$), since the counter is then effectively transferring information, not changing it. The third AND block "+A" associated with the third bit position of the sum generation circuitry receives inputs A3 and $\overline{P1–3}$. When the third bit position (A1) is a one and there is no propagation from the first bit position to the third bit position of the first group ($\overline{P1–3}$) the output should be unchanged (that is S3 should be one).

Referring to FIGURE 5, the sum checking logic implementing Equations 12 and 15 is shown. As described previously with reference to FIGURE 2, the output of the 18-bit counter and certain portions of the "propagation" information are stored in latches for timing reasons, there being no logical reason that the information cannot be taken from the counter of FIGURE 4 directly. The control COUNT K input is used as the predicted propagate into the low order bit, being inverted by the DOWN M line condition to match the inverted actual propagate for the low order bit. The philosophy of this logic is similar to that of the sumchecking logic of the simplified embodiment shown in FIGURE 1, with the exception that the terms correspond to the embodiment of FIGURE 4. Each bit position of the sum checking logic includes one exclusive OR block "+V̲" and two AND blocks "+A." A single exclusive OR block "—V̲" is shared by each two adjacent bit positions. For each bit position the inputs (for instance S1 and $p1$), are used to generate an actual propagate (for instance P1), into that order. The AND blocks "+A" having inputs $p1$, $\overline{S1}$, $\overline{p1}$ and M are used to generate a predicted propagate P2′ into the next order. The inferred actual propagate (P1, P2, etc.) for an order is compared with the predicted propagate (P1′, P2′, etc.) for that order in an exclusive OR block "—V̲." If there is correspondence, no error has occurred. If there is no correspondence, there will be an output from the exclusive OR block "—V̲." For instance, if P2 does not equal P21, there will be an input to the single OR block "—O," causing an output (—P any $P \neq P'$) indicating a sum error.

The operation of the second embodiment of the invention shown in FIGURES 4 and 5 will now be described. The number 010 – – – 001111 will be entered into orders A18 to A1 respectively for incrementing by 1. Utilizing the rule previously explained, it is to be expected that the lowest order bit position is inverted and that every other bit position 1 through 5 is inverted, giving a final answer: 010 – – – 010000.

The following inputs of the bit function generator are initially positive: A1, A2, A3, A4 and A17. The M line is positive. As a result, the outputs of the bit function generator A1, A2, A3, A4, A17, $\overline{A5}$ through $\overline{A16}$ and $\overline{A18}$ will be positive. The true output lines from the bit function generator ($p5$ through $p16$ and $p18$) will have signals thereon. Referring to the first group function generator, all of the inputs $p1$, $p2$ and $p3$ are present, resulting in outputs on lines P1–2, P1–3 and P1–4. Referring to the second group function generator, only the input $p4$ is present, resulting in outputs on lines P4–5, $\overline{P4–6}$ and $\overline{P4–7}$. In all of the remaining group function generators only input $p17$ is present, resulting only in $\overline{P}_{j-k}$ outputs.

When a positive signal is applied to the COUNT K line, the output of the convert block "+C" in the second level propagation logic will be P0–1. This is applied to all of the AND circuits "+A" of the second level propagation logic as well as to some of the sum generation circuitry.

Referring to the first AND circuit "+A" of the second level propagation logic, both inputs P1–4 and P0–1 are present, causing an output P0–4. There are no other outputs from the second level propagation logic circuit since there are no other inputs satisfying all of the logic conditions of that circuit.

Referring to the sum generation logic, the following inputs (taken in order as shown in FIGURE 4), are present: P0–1, A1, P0–1, P1–2, A2, A2, P0–1, P1–3, P1–3, A3, P0–4, A4, P0–4, $\overline{A5}$, P4–5, P0–4, $\overline{A6}$, $\overline{P4–6}$, $\overline{P0–7}$, $\overline{P0–10}$, $\overline{P0–13}$, $\overline{A16}$, $\overline{P0–16}$, $\overline{P0–16}$, A17, $\overline{P16–17}$, $\overline{A18}$, $\overline{P0–16}$ and $\overline{P16–18}$. Inspection of the sum generation logic will show that all of the inputs to only two of the AND circuits are satisfied. In the fifth bit position of the sum generation circuitry the inputs P0–4, $\overline{A5}$, P4–5 are applied to a single AND circuit resulting in an output, representative of a one, from the line S5. In the seventeenth bit position of the sum generation circuitry, the inputs A17, $\overline{P0–16}$ and $\overline{P16–17}$ are to the same AND circuit (corresponding to the sixth AND circuit of the sum generation circuitry, for bits 4, 5 and 6) giving an output on the line S17 representative of a one. Since there are no other outputs from the sum generation circuitry, all other bit positions are representative of a zero. Therefore, reading from bit position S18 through S1, the output will be: 010 – – – 010000. This is the number 010 – – – 001111 incremented by one.

Referring now to FIGURE 5, the operation of a sum checking logic will be described for the above example with relation to bit positions 1, 2 and 18. All other bit positions operate in a similar manner so that it is not necessary to describe them at this time in view of the fact that a more detailed description was given in the simplified embodiment of the sum checking logic in FIGURE 1. The inputs to the three pertinent positions of the sum checking logic are as follows: K, $p1$, $\overline{S1}$, $p2$ and $\overline{S2}$. The following outputs from the exclusive OR "+V̲" and AND blocks "+A" will occur: P1′, P1, P2′, P2, P3′ and P3. There will be no outputs on lines P18 and P18′. As a result, all of the predicted propagates equal the inferred propagates and no sum errors exist, the line "—P any $P \neq P'$ remaining down (+P).

A count-up count-down counter utilizing parallel carry and parallel sum generation with sum checking has been described. It is obvious that this concept can be extended to counters of any size and to incrementing and decrementing of input values by more than one.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for selectively incrementing and decrementing a binary quality having a number of orders, including: a number of input means, each having an output for supplying a signal representative of one order of said binary quantity; a single control means for supplying one signal representative of an increment command and another signal representative of a decrement command; a number of orders of simultaneously functioning summing means, determined by the number of binary orders, each order having first and second inputs for receiving signals and each order having an output for supplying signals representative of the sum of the signals received by the corresponding first and second inputs, a number of orders of simultaneously functioning propagation means, determined by the number of binary orders, each order having first and second inputs for receiving signals and each order having an output for supplying propagate signals representative of the signals received by corresponding, and all lower order, ones of said first and second inputs; means for transferring said binary signals from said input means to corresponding orders of said first inputs of said summing means and to corresponding orders of said propagation means first inputs; means for transferring said control signal from said control means to said propagation means second inputs; and means for transferring said propagation means output signals to corresponding ones of said summing means second inputs.

2. The apparatus of claim 1, including a number of simultaneously functioning sum checking means, each one comprising: first means each corresponding to an order of said binary quantity, each of said first means having first, second and third inputs for receiving signals and each having a first output for supplying signals representative of propagate signals predicted for the corresponding output of said propagation means and having a second output for supplying a signal representative of propagate signals inferred for the corresponding order of said propagation means; second means each associable with certain orders of said binary quantity, each of said second means having first and second inputs for receiving signals and each having an output for supplying signals indicative of an error when said received signals are different; means for transferring said binary signals from said input means to the first inputs of corresponding ones of said first means; means for transferring said sum signals from said summing means to the second inputs of corresponding ones of said first means; means for transferring said control signal from said control means to the third inputs of corresponding ones of said first means; and means for transferring said predicted and propagate signals from said first and second outputs of said first means to the first and second inputs of associated ones of said second means.

3. In combination: inputs means for supplying first signals and second signals representative of a number of orders of a binary quantity; single control means for supplying one signal indicating a count-up command and another signal indicating a count-down command; propagate means, operable by signals from said control means and each order of said input means, having a number of orders of outputs determined by the number of orders of said binary quantity, for supplying substantially simultaneously propagate signals, said propagate signals indicating that a selected order and all lower orders of said binary quantity are represented by said first signals when said control signal indicates a count-up command, and by said second signals when said control signal indicates a count-down command, and summation means operable by signals from each order of said input means and each order of said propagate means, having a plurality of outputs equal to the number of input orders, each of said outputs substantially simultaneously supplying a sum signal representing the binary sum of the corresponding inputs.

4. The combination of claim 3, including: checking means operable by signals from said input means, said summation means and said control means having a number of outputs, determined by the number of orders of said binary quantity, each of said outputs substantially simultaneously supplying a signal representative of a propagate signal predicted for a corresponding order of said propagate means; and error means operable by signals from said checking means and by said signals representative of propagations, for emitting an error signal when the propagate signal predicted for an order of said propagate means does not equal the propagation for that order.

5. Apparatus for selectively incrementing and decrementing an initial binary quantity having a number of orders represented by signals of a first type and a second type, including: means for modifying said initial quantity by replacing the signal of one type, representing the lowest order of said initial quantity, with a signal of the other type; control means for supplying a signal indicative of an increment command and a signal indicative of a decrement command; propagate means responsive to said quantity representation signals and said control signals for generating, substantially simultaneously, a number of propagate signals indicative of inter-order propagations attributable to the commands indicated by said control signals; means associated with said replacing means and said propagate means for combining said modified binary quantity with said propagate signals, generating substantially simultaneously at a number of outputs, equal to the number of orders of said initial binary quantity, first and second types of signals representative of said binary quantity processed as indicated by said control signals.

6. Apparatus for the type described in claim 5, including: first means responsive to said initial quantity representative signals said control signals and said processed quantity representative signals for generating substantially simultaneously a number of proparagate signals predicted for generation by corresponding orders of said propagate means; and second means for emitting an error signal when any one of said predicted propagate signals is not matched by signals representative of a corresponding inter-order propagation.

References Cited in the file of this patent

UNITED STATES PATENTS

| | | |
|---|---|---|
| 2,735,005 | Steele | Feb. 14, 1956 |
| 2,879,001 | Weinberger | Mar. 24, 1959 |
| 2,926,850 | Richards | Mar. 1, 1960 |
| 2,954,168 | Maddox | Sept. 27, 1960 |